United States Patent [19]

Shibata et al.

[11] Patent Number: 4,853,279

[45] Date of Patent: Aug. 1, 1989

[54] CURABLE COMPOSITION FOR A FIBER-REINFORCED RESIN

[75] Inventors: Jouji Shibata, Honjo; Kazuo Ohtani, Fukaya; Norio Shinohara, Isesaki; Toshiaki Hanyuda, Yokohama, all of Japan

[73] Assignee: Showa Highpolymer Co., Ltd., Tokyo, Japan

[21] Appl. No.: 30,748

[22] Filed: Mar. 27, 1987

[30] Foreign Application Priority Data

Mar. 27, 1986 [JP] Japan .................................. 61-67225

[51] Int. Cl.⁴ ...................... B32B 7/00; B32B 27/34; C08K 5/20; C08K 7/04

[52] U.S. Cl. .................................... 428/267; 428/268; 428/290; 428/408; 428/417; 428/902; 525/115; 525/118; 525/485; 525/488; 525/489; 525/531; 523/400; 523/455; 523/468

[58] Field of Search ............... 525/531, 115, 118, 485, 525/488, 489; 428/267, 268, 290, 408, 417, 902; 523/400, 455, 468

[56] References Cited

U.S. PATENT DOCUMENTS

| | | | |
|---|---|---|---|
| 3,980,483 | 9/1976 | Nishikubo et al. ................... | 525/531 |
| 4,309,473 | 1/1982 | Minamisawa et al. ............... | 525/531 |
| 4,465,806 | 8/1984 | Lee ....................................... | 525/531 |
| 4,540,752 | 9/1985 | McFadden .......................... | 525/531 |
| 4,595,734 | 6/1986 | O'Hearn .............................. | 525/531 |
| 4,618,658 | 10/1986 | Hofner, Jr. et al. ................. | 525/531 |
| 4,690,988 | 9/1987 | Heffman et al. .................... | 525/531 |

FOREIGN PATENT DOCUMENTS

| | | | |
|---|---|---|---|
| 1196440 | 11/1985 | Canada ............................... | 525/531 |
| 0033542 | 8/1981 | European Pat. Off. ............ | 525/531 |
| 59-275937 | 12/1984 | Japan . | |

*Primary Examiner*—John C. Bleutge
*Assistant Examiner*—Robert E. L. Sellers, II
*Attorney, Agent, or Firm*—Oblon, Spivak, McClelland, Maier & Neustadt

[57] ABSTRACT

A curable composition for a fiber-reinforced resin, comprises (A) 60–90 weight % of an epoxy-containing (meth)acrylate resin which contains an epoxy group and an unsaturated-monobasic acid ester group in its molecules and which is formed by the reaction of an epoxy resin containing at least two epoxy groups per molecule and having an epoxy equivalent of 100–1000 with an unsaturated-monobasic acid in an amount such that there are 0.2–0.7 equivalents of carboxyl groups per 1 equivalent of epoxy groups, (B) 40–10 weight % of a radical polymerizable monomer, (C) an organic peroxide, (D) a curing agent for the epoxy resin, and (E) one or more reinforcing materials selected from continuous fiber and fiber cloth.

4 Claims, No Drawings

CURABLE COMPOSITION FOR A FIBER-REINFORCED RESIN

BACKGROUND OF THE INVENTION

This invention relates to a high-strength curable composition for a fiber-reinforced resin. More particularly, it relates to a curable composition for a fiber-reinforced resin which is suitable for molding of structural parts for automobiles, heavy vehicles, and the like in which light weight and fatigue resistance are important.

Significant increases in the fuel efficiency and driving comfort of automobiles have been obtained by improvements in the design of body shape and internal combustion engines. Still further improvements are being achieved by the use of plastic parts, which are superior to metallic parts from the standpoints of lightness and workability. Plastic parts are being used increasingly for various structural parts such as drive shafts, steering wheels, bumpers, brackets, and springs.

In the past, many of these structural parts were made of steel. At present, some of these parts are made of lightweight alloys in order to achieve decreases in weight. However, the performance of lightweight alloys is still inadequate in certain respects, and for this reason, there is now an interest in fiber-reinforced resins which are lighter than alloys, do not rust, and have excellent mechanical properties.

For example, Japanese Published Patent Application No. 58-28454 discloses an FRP leaf spring for automobiles which has excellent fatigue resistance. The spring is manufactured by reacting a bisphenol-type epoxy resin and an unsaturated-monobasic acid in amounts such that there is approximately one equivalent of epoxy groups per each equivalent of the unsaturated-monobasic acid to obtain a vinyl ester resin, dissolving this resin in a polymerizable vinyl monomer to obtain a resin composition, impregnating fiber reinforcement with the resin composition, and then molding and curing.

In addition, "Special Steels" (Vol 34, No. 8, Aug., 1985, pages 51-55, in Japanese) contains an article which briefly explains new types of leaf springs. In the article, epoxy resins and vinyl ester resins are mentioned as suitable examples of a matrix resin. However, as stated therein, there is a need for resins which have a higher heat resistance, a lower viscosity, a longer pot life, a shorter curing time, and a lower cost than these two types of resins.

Presently-known fiber-reinforced resins include unsaturated polyester resins, epoxy resins, vinyl ester resins (also referred to as epoxy acrylate resins), urethane acrylate resins, polyamide resins, phenol resins, furan resins, and the like which are reinforced with fibers such as glass fibers, carbon fibers, polyamide fibers, and alumina fibers. Among these, polyamide resins, phenol resins, and furan resins are expensive and excessively difficult to mold. Accordingly, unsaturated polyester resins, epoxy resins, vinyl ester resins, and urethane acrylate resins are more frequently used. In particular, for parts such as springs which require fatigue resistance, high strength, and high stiffness, it is common to use epoxy resins which have excellent heat resistance and can be strongly bonded to reinforcing materials. Unsaturated polyester resins, vinyl ester resins, and urethane acrylate resins are far superior to epoxy resins with respect to their viscosity, which is low and facilitates the impregnation of fibers, and with respect to their curing speed, which is faster. However, the adhesiveness of these resins to fibers and their heat resistance are inadequate, and therefore they have not attained the reliability of epoxy resins.

SUMMARY OF THE INVENTION

It is an object of the present invention to provide a curable composition for a fiber-reinforced resin which can be easily and quickly molded.

It is another object of the present invention to provide a curable composition for a fiber-reinforced resin which has excellent fatigue resistance.

It is yet another object of the present invention to provide a curable composition for a fiber-reinforced resin which results in a uniform and transparent cured product.

It is still another object of the present invention to provide a curable composition for a fiber-reinforced resin which has good adhesiveness to reinforcing fibers.

A curable composition for a fiber-reinforced resin in accordance with the present invention comprises (A) 60–90 weight % of an epoxy-containing (meth)acrylate resin which contains an epoxy group and an unsaturated-monobasic acid ester group in each molecule and which is formed by the reaction of an epoxy resin, which contains at least two epoxy groups in each molecule and which has an epoxy equivalent of 100–1000, with an unsaturated-monobasic acid in an amount of 0.2–0.7 equivalents of carboxyl groups for 1 equivalent of epoxy groups, (B) 40–10 weight % of a radical polymerizable monomer, (C) an organic peroxide, (D) a curing agent for the epoxy resin, and (E) continuous fibers or fiber cloth.

DESCRIPTION OF THE PREFERRED EMBODIMENTS

A (meth)acrylate resin containing epoxy groups (hereinafter referred to as an epoxy-containing (meth)acrylate resin) which is used in the present invention is a resin which is obtained by the reaction between a well-known bisphenol-type epoxy resin or the like which contains at least 2 epoxy groups per molecule and an unsaturated-monobasic acid such as (meth)acrylic acid. In the reaction, there is less than one equivalent of the acid present with respect to the epoxy groups in the epoxy resin. After the reaction, i.e., after esterification, some epoxy groups still remain in the resin which is formed, together with unsaturated-monobasic acid ester groups.

In many cases, due to the use of an esterification catalyst which contains basic compounds of tertiary amines and the like or salts thereof in the reaction between an epoxy resin and an unsaturated-monobasic acid, the resulting resin which has epoxy groups remaining in its molecules (called a base resin) is unstable when stored over a period of time. Namely, the amount of epoxy groups in the base resin gradually decreases, and in some cases, resinification progresses and the viscosity increases. In contrast, as previously disclosed by the present inventors in Japanese Patent Application No. 59-275937, when an esterification catalyst such as chromium naphthenate, zirconium naphthenate, lithium naphthenate, or lithium chloride is used, no such problems take place and the viscosity of the base resin remains low.

In the same manner as for a conventional vinyl ester resin or an unsaturated polyester resin, the type of epoxy-containing (meth)acrylate resin used in the present invention is diluted with a reactive diluent monomer, e.g., a radical polymerizable monomer such as styrene, radical polymerization is initiated using a radical initiator such as an organic peroxide, and curing can be effected by a curing agent for epoxy resins such as an acid anhydride, a fatty amine, or an aromatic amine, an amino compound such as imidazole or dicyandiamide, a polyphenol such as novolak phenol, or a latent curing agent such as a Lewis acid amine complex.

The characteristics of a resin of this type in which epoxy groups and (meth)acrylic groups are present together might appear to one skilled in the art to be attainable merely by a blend of a usual epoxy resin and a usual vinyl ester resin. However, even with such a blend, the amount of epoxy groups may decrease and the resin becomes unstable. This can be prevented by the use the vinyl ester resin obtained by the use of an esterification catalyst as in the examples of the previously-mentioned Japanese Patent Application No. 59-275937.

However, when a blend of an epoxy resin and the above-mentioned vinyl ester resin is cured using, for example, a curing agent in the form of a radical initiator and an acid anhydride in the form of trimellitic anhydride, for some reason, the resulting cured product is white, turbid, and opaque. In contrast, when an epoxy-containing (meth)acrylate resin according to the present invention is prepared by reacting an epoxy resin and (meth)acrylic acid in a ratio which can be calculated from the above-described blending proportion, and this epoxy-containing (meth)acrylate resin is cured with the same curing agent, a uniform and transparent cured product is obtained. It is conjectured that the reason for this is that the former product has an interpenetrating network structure, while the latter product is nearly a copolymer. When the former product is made into a reinforced plastic, it is highly opaque, which makes it difficult to detect voids and the like due to poor defoaming which are undesirable in FRP. Quality control is therefore difficult, and the reliability of the properties of the product inevitably decreases. Accordingly, it was found that, rather than using a blend, it is most appropriate to use an epoxy-containing (meth)acrylate resin according to the present invention which has an epoxy group and an unsaturated-monobasic acid ester group in each molecule and which is formed by the reaction of an epoxy resin and an unsaturated-monobasic acid, which is chosen in accordance with the intended use.

The normal method of molding structural parts, and in particular springs and the like, is to impregnate a reinforcing material in the form of fiber roving or cloth with a resin by sheet winding, filament winding, or by a continuous pultrusion apparatus. The impregnated material is then precured or completely cured. In some cases, however, after pre-impregnation, the impregnated material is shaped by press molding and cured. Important factors in workability are the liquid stability of the base resin and the curing agent composition and the rapidity of shaping and demolding.

The resin of the present invention has the significant merit that the gelation time is faster than for an epoxy resin and therefore a molded product can be more quickly removed from a mold. Furthermore, it is possible to impart a low viscosity to the resin, which is necessary for the impregnation and wetting of reinforcing fibers. Thus, the properties of a molded product in accordance with the present invention are statically and dynamically comparable to those of a high-strength reinforced plastic made from an epoxy resin.

Next, the make-up of the present invention will described in detail.

An epoxy-containing (meth)acrylate resin which is used in the present invention is a product which is formed by the reaction of an epoxy resin, which has an epoxy equivalent of 100–1000 and more preferably of 170–700 and which has at least two epoxy groups in each molecule, with an unsaturated-monobasic acid such as acrylic acid or methacrylic acid in an amount such that there are 0.2–0.7 equivalents of carboxyl groups in the unsaturated-monobasic acid for 1.0 equivalent of epoxy groups in the epoxy resin. The epoxy resin is one or more compounds selected from a glycidyl ether which is obtained by the condensation of bisphenol and an epihalohydrin; a novolak-type glycidyl ether which is obtained by the condensation of phenol novolak or cresol novolak with an epihalohydrin; a halogenated glycidyl ether which is obtained by the condensation of halogenated bisphenol or halogenated novolak with an epihalohydrin; an amine-type glycidyl ether which is obtained by the condensation of diaminodiphenylmethane or diaminodiphenyl sulfone or aminophenol with an epihalohydrin; a triazine-type glycidyl ether which is obtained by the condensation of cyanuric acid or isocyanuric acid with an epihalohydrin; a glycidyl ester which is obtained by the condensation of a polybasic acid such as phthalic acid, terephthalic acid, or isophthalic acid with an epihalohydrin; and a glycidyl ether obtained by the condensation of an alkylene oxide addition product of bisphenol and an epihalohydrin.

If the amount of carboxyl groups is less than 0.2 equivalents, the speed of pull-out from a mold is no better than that of an epoxy resin, irrespective of the type of curing agent which is used for the epoxy resin. Furthermore, when the carboxyl equivalent is greater than 0.7 equivalents, the fatigue resistance of the resulting molded product is no better than that of a conventional FRP comprising a vinyl ester resin.

As shown in the examples of Japanese Patent Application No. 59-275937, if chromium naphthenate is used as an esterification catalyst in the reaction between an epoxy resin and an unsaturated-monobasic acid, the reaction will proceed quickly and the base resin will be stable over time with no decrease in the amount of epoxy groups which remain. Chromium naphthenate and the other substances mentioned in that patent application are effective as a catalyst in the present invention as well. If this catalyst is used, the stability of the base resin is maintained even if during the reaction between the epoxy groups in the epoxy resin and the unsaturated-monobasic acid there is approximately one equivalent of epoxy groups for each equivalent of the unsaturated-monobasic acid ester groups, and even if the epoxy resin is blended in the same proportions as the previously-mentioned epoxy-containing (meth)acrylate resin after the reaction goes to completion. However, as mentioned previously, the cured product sometimes becomes white, turbid, and opaque. Therefore, depending on the objective, the use of this blend-type resin may be greatly restricted.

At a temperature of 80°–130° C. the reaction between the epoxy resin and the unsaturated-monobasic acid is completed in about 30 minutes–8 hours. The progress of the reaction can be checked by measuring the free acid value. In many cases, even if a liquid curing agent for the epoxy resin is added, the epoxy-containing (meth)acrylate resin has a high viscosity. Therefore, in order to lower the viscosity, it is diluted with a radical polymerizable monomer which is known as a reactive diluent. Some typical examples of a radical polymerizable monomer are vinyl monomers such as styrene, vinyltoluene, and chlorostyrene; and well-known (meth)acrylate monomers such as ethylene glycol di(meth)acrylate, propylene glycol di(meth)acrylate, diethylene glycol di(meth)acrylate, dipropylene glycol di(meth)acrylate, hexanediol di(meth)acrylate, neopentyl glycol di(meth)acrylate, glycerin tri(meth)acrylate, glycerin di(meth)acrylate, trimethylolethane tri(meth)acrylate, trimethylolpropane tri(meth)acrylate, trimethylolpropane di(meth)acrylate, pentaerythritol tetra(meth)acrylate, and pentaerythritol tri(meth)acrylate. The amount of a radical polymerizable monomer which is used is normally less than the amount of the epoxy-containing (meth)acrylate resin, and 10–40 weight % is suitable.

For the curing of the present invention, both an organic peroxide which makes radical polymerization possible and a conventional curing agent for the epoxy resin are necessary. Examples of a curing agent for the epoxy resin are a polybasic acid anhydride, a polyamine, polyvalent phenol, and a $BF_3$-amine complex.

Some examples of an organic peroxide, which is necessary for the radical copolymerization of the acrylate and the radical polymerizable monomer, are benzoyl peroxide, dimyristyl peroxydicarbonate, dicumyl peroxide, 1,1-bis(t-butylperoxy)-3,3,5-trimethylsiloxane, lauroyl peroxide, cyclohexanone peroxide, tert-butyl peroxy-2-ethylhexanoate, and tert-butyl peroxybenzoate. So-called redox types may also be used, such as ketone peroxides such as methyl ethyl ketone peroxide and cobalt salts; cumene hydroperoxide and manganese salts; and benzoyl peroxide and dimethylaniline. The amount of the organic peroxide which is used is preferably 0.1–5 parts by weight per 100 parts by weight of the total weight of the epoxy-containing (meth)acrylate resin and the radical polymerizable monomer.

The curing agent, which is necessary for the curing of the epoxy groups in the resin, can be selected from polybasic acid anhydrides, polyamines, polyvalent phenol, and a Lewis acid complex. These curing agents are described on pages 164–254 of the book "New Epoxy Resins" (in Japanese), edited by Hiroshi Kakiuchi and first published by Shokodo Press on May 10, 1985.

Some examples of a polybasic acid anhydride are phthalic anhydride, maleic anhydride, itaconic anhydride, succinic anhydride, trimellitic anhydride, pyromellitic anhydride, hexahydrophthalic anhydride, tetrahydrophthalic anhydride, methyl nadic anhydride, methyltetrahydrophthalic anhydride, benzophenonetetracarboxylic anhydride, methylhexahydrophthalic anhydride, and methylcyclcohexene tetracarboxylic anhydride.

Some examples of an amine curing agent are a fatty polyamine such as menthanediamine, isophoronediamine, diethylenetriamine, triethylenetetramine, and bis(4-amino-3-methylcyclohexyl)methane; an aromatic polyamine such as methaphenylenediamine, diaminodiphenylmethane, diaminodiphenyl sulfone, and methaxylylenediamine; 2-ethylimidazole, 2-ethyl-4-methylimidazole, 2-phenylimidazole, benzylmethylimidazole, and cyanoethylate of imidazole and inorganic acid complex of imidazole; amino compounds such as dicyandiamide, hydrazide, and the like; and a Lewis acid amine complex such as $BF_3$-amine complex and the like. Furthermore, some examples of a polyvalent phenol-type curing agent are phenol novolak, cresol novolak, and polyvinyl phenol.

The curing agent is used in an amount of 0.5–70 parts by weight per 100 parts by weight of the total of the epoxy-containing (meth)acrylate resin and the radical polymerizable monomer.

As a curing promoter for the epoxy resin, conventional promoters can be used in the present invention such as tertiary amines for acid anhydrides, while salicylic acid, dicyandiamide, and the like can be used for amines. Furthermore, hydroquinone, monomethyl hydroquinone, tertiary butyl hydroquinone, p-benzoquinone, copper salts, and other known polymerization-inhibitors can be used in the present invention for adjusting the storage stability and the radical curing of the present invention.

As the continuous fiber or fiber cloth for use in the present invention, glass roving, glass roving cloth, Aramid fiber roving, Aramid fiber roving cloth, carbon fiber roving, and carbon fiber roving cloth can be utilized. These materials can also be used in combination with one another. Normally, the continuous fiber or fiber cloth is used in an amount equal to 50–80 weight % of the entire curable composition. Examples The present invention will now be further explained by means of a number of working examples. In these examples, glass roving which was arranged in parallel in one direction was first impregnated with a resin. It was then press molded, postcured after removal from the mold, and then used as a test material. The demolding time necessary in order to obtain an adequately shaped molded product was determined, using an epoxy resin molded product as a standard. The static strength and the modulus of elasticity were determined in accordance with JIS K 6911 test procedures, and the fatigue strength was measured using a Model KS all-purpose fatigue tester manufactured by Kisha Seizo Co. A stress of 40±25 kg/square mm was periodically applied by three-point bending at a rate of 1000 cycles per minute, and the variation in the longitudinal elastic modulus as a function of the number of fatigue cycles was investigated.

EXAMPLE 1

185 g (1.0 equivalent) of Epikote 828, which is a bisphenol-type epoxy resin manufactured by the Shell Chemical Company, 43 g (0.5 equivalents) of methacrylic acid, 0.1 g of hydroquinone, and 0.7 g of chromium naphthenate (3% metallic chromium) were prepared and were reacted at 120°–130° C. for 3–4 hours while blowing air into the mixture, as a result of which the acid value reached approximately 0. After the reaction was completed, 57 g (20 weight % of the total) of a styrene monomer were added.

A composition was made by adding 41 parts of methyl nadic anhydride, 0.4 parts of 1,1-bis(t-butylperoxy)-3,3,5-trimethylcyclohexane, and 0.5 parts of trisdimethyl aminomethylphenol to 100 parts of this resin. In order to determine the characteristics of a hardened product made from the composition, a sample of the composition was poured into a mold and then left in a dryer, first at 100° C. for 3 hours and then at 150° C. for 7 hours, as a result of which a cured, transparent resin was obtained. Next, glass roving which was arranged in parallel was impregnated with this composition, after which the impregnated roving was formed by press molding using metal matched dies (10 mm deep, 220 mm wide, and 300 mm long). The temperature of the metal dies was 110° C. After 30 minutes of hot forming, the molded product could be removed from the dies. This is about half the time required under the same conditions for an Epikote 828 composition, i.e., a composition of 100 parts of Epikote 828, 82 parts of methyl nadic anhydride, and 1.0 parts of trisdimethyl aminomethylphenol. The molded product was then postcured in a drier at 150° C. for 7 hours. The resulting molded product was transparent, contained 72 weight % of glass, and had a longitudinal elastic moldulus of 4000 kg/square mm. The molded product was then subjected to a fatigue test to determine the effects of bending on its longitudinal elastic modulus. After 5.7 million cycles of 3-point bending, the retention of the longitudinal elastic modulus was 100%.

EXAMPLE 2

42 parts of trimellitic acid anhydride, 4 parts of trimethyl ammonium chloride, and 0.4 parts of 1,1-bis(t-butylperoxy)-3,3,5-trimethylcyclohexane were added to 100 parts of the resin synthesized in Example 1, and thorough stirring was performed to obtain a composition with a viscosity of 41.5 poise at 25° C. The heat deformation temperature of this cast product was 174° C.

Next, in the same manner as in Example 1, glass roving which was arranged in parallel was impregnated with this composition, and pressure molding was performed in metal molds at 150° C. for 5 minutes. The molded product was then removed from the molds and postcured in a drier at 150° C. for 2 hours. The resulting molded product contained 67.8 weight% of glass, was transparent, and had a longitudinal elastic modulus of 3570 kg/square mm. A fatigue test was performed on this FRP molded product under the same conditions as for Example 1. After 5.7 million bending cycles, the retention of the longitudinal elastic modulus was 98.2%.

EXAMPLE 3

0.8 parts of 2-ethyl-4-methylimidazole and 0.4 parts of t-butylperoxy-2-ethylhexanoate were added to 100 parts of the resin synthesized in Example 1 and thorough stirring was performed to obtain a composition having a viscosity of 9.3 poise at 25° C. This composition was poured into a mold and then left in a drier, first at 80° C. for 100 minutes, and then at 150° C. for 4 hours to obtain a transparent cast product with a heat deformation temperature of 168° C. Next, in the same manner as in Example 1, glass roving which was arranged in parallel was impregnated with this composition, and then pressure molded in a metal mold at 80° C. It could be removed from the mold after 20 minutes of molding, which was roughly half the time required under the same conditions using an Epikote 828 composition, i.e., one comprising 100 parts of Epikote 828 and 2 parts of 2-ethyl-4-methylimidazole. It was then postcured at 150° C. for 4 hours. The resulting FRP molded product contained 75.6 weight % of glass, was transparent, and had a longitudinal elastic modulus of 3590 kg/square mm. Next, a fatigue test was carried out in the same manner as in Example 1. After 5.6 million bending cycles, the retention of the longitudinal elastic modulus was 97%.

EXAMPLE 4

183 g (1.0 equivalent) of DEN 438, which is a novolak-type epoxy resin manufactured by the Dow Chemical Company, 0.2 equivalents of methacrylic acid, 0.1 g of hydroquinone, and 0.4 g of chromium naphthenate were prepared and reacted at 100°–120° C. for 1–2 hours while blowing air into the mixture, as a result of which the acid value reached approximately 0. After the reaction was completed, 50.1 g (20 weight % of the total) of a styrene monomer were added.

To 100 parts of this resin, 66 parts of methyl nadic anhydride, 0.4 parts of 1,1-bis(t-butylperoxy)-3,3,5-trimethylcyclohexanone, and 0.8 parts of trisdimethyl aminomethylphenol were added and thorough stirring was performed until a viscosity of 3 poise at 25° C. was attained. The mixture was then poured into a mold and left in a drier, first at 100° C. for 3 hours, and then at 150° C. for 7 hours. As a result, a transparent cast product having a heat deformation temperature of 180° C. was obtained.

Next, in the same manner as in Example 1, glass roving which was arranged in parallel was impreganted with this composition, after which it was pressure molded in a metal mold at 150° C. for 5 minutes. After removal from the mold, the molded product was postcured in a drier at 150° C. for 7 hours. The resulting molded product was transparent and contained 72 weight % of glass. The longitudinal elastic modulus of this molded product was 4100 kg/square mm. A fatigue test was performed on this product under the same conditions as in Example 1. After 5.3 million bending cycles, the retention of the longitudinal elastic modulus was 99%.

EXAMPLE 5

In the same manner as in Example 1, 185 g (1.0 equivalent) of Epikote 828, 60.2 g (0.7 equivalents) of methacrylic acid, 0.1 g of methylhydroquinone, and 0.8 g of chromium naphthenate were prepared and reacted at 120°–130° C. for 3–4 hours while blowing air into the mixture, as a result of which the acid value reached approximately 0. After the completion of the reaction, 61.3 g (20 weight % of the total) of a styrene monomer were added. 27 parts of BRG-557 (hydroxyl group equivalent: 104), which is a phenolic novolak resin manufactured by Showa High Polymer Co., Ltd., and 0.6 parts of t-butylperoxyhexanoate were added to 100 parts of this resin. After thorough mixing, the composition was poured into a mold and left in a drier, first at 80° C. for 100 minutes, and then at 180° C. for 2 hours. A cast product with a heat deformation temperature of 132° C. was obtained.

Next, in the same manner as in Example 1, glass roving which was arranged in parallel was impregnated with this composition, pressure molded in a metal mold at 80° C. for 60 minutes, removed from the mold, and postcured in a drier at 180° C. for 2 hours. A transparent molded product containing 74 weight % of glass and having a longitudinal elastic modulus of 3800 kg/square mm was obtained. It was subjected to a fatigue test in the same manner as in Example 1. After 5.6 million bending cycles, the retention of the longitudinal elastic modulus was 97%.

EXAMPLE 6

Glass roving which was arranged in parallel was impregnated with the composition used in Example 3, after which it was preheated using a high-frequency preheater manufactured by Fuji Denpa Koki Co. until the temperature of the entire resin-impregnated body was 70°–80° C. It was then immediately inserted into a metal mold (25 mm deep, 220 mm wide, and 300 mm long) at 150° C. and press molding was performed. It was possible to remove the molded body from the mold after 2.5 minutes.

This time is roughly half of that required for an Epikote 828 composition.

Comparative Example 1

183 g (1.0 equivalent) of DEN 438, which is a novolak-type epoxy resin manufactured by the Dow Chemical Company, 86 g (1.0 equivalent) of methacrylic acid, 0.1 g of hydroquinone, and 1 g of triethylamine were prepared and reacted at 100°–120° C. for 3–4 hours while blowing air into the mixture, as a result of which the acid value reached 10. 115.3 g (30 weight % of the total) of a styrene monomer were added, and a resin with a viscosity of 10 poise at 25° C. was obtained.

1.0 parts of cyclohexanone peroxide and 0.5 parts of dimyristyl peroxycarbonate were added to 100 parts of this resin, thorough mixing was performed, and then the mixture was poured into a mold and left in a drier at 110° C. for 30 minutes. Postcuring was then carried out in a drier at 120° C. for 2 hours, and a cast product with a heat deformation temperature of 150° C. was obtained.

Next, in the same manner as in Example 1, glass roving which was arranged in parallel was impregnated, pressure molded for 5 minutes in a metal mold at 110° C., and removed from the mold, after which postcuring was performed in a drier at 120° C. for 2 hours. The resulting FRP molded body contained 77 weight % of glass and had a longitudinal elastic modulus of 3590 kg/square mm. Next, a fatigue test was performed on the molded product in the same manner as in Example 1. After 6 million bending cycles, the retention of the longitudinal elastic modulus was 65%.

Comparative Example 2

82 parts of methyl nadic anhydride and 1.0 parts of trisdimethyl aminomethylphenol were added to 100 parts of Epikote 828 and thorough stirring was performed to obtain a composition with a viscosity of 20 poise at 25° C. This composition was poured into a metal mold and then left in a drier, first at 100° C. for 3 hours, and then at 150° C. for 15 hours. A cast product with a heat deformation temperature of 120° C. was obtained.

Next, in the same manner as in Example 1, glass roving which was arranged in parallel was impregnated with this composition and then presure molded in a metal mold at 110° C. for 60 minutes. It was then removed from the mold and subjected to postcuring in a drier at 150° C. for 15 hours. The resulting molded product contained 73.9 weight % of glass and had a longitudinal elastic modulus of 3450 kg/square mm. Next, a fatigue test was performed thereon in the same manner as in Example 1. After 1.5 million bending cycles, the retention of the longitudinal elastic modulus was 98%.

From the above results, it can be seen that a curable composition for a fiber-reinforced resin in accordance with the present invention quickly undergoes gelation and can be easily removed from a mold. Furthermore, a molded product having superior fatigue resistance can be obtaianed therefrom. These advantages make it highly suitable for use in structural parts for automobiles and heavy vehicles.

What is claimed is:

1. A curable composition for a fiber-reinforced resin having a viscosity of a range of 3–41.5 poise at 25° C., consisting essentially of:
   60–90 weight % of an epoxy-containing acrylate or methacrylate resin which contains an epoxy group and an unsaturated ester group in its molecules, and which is formed by the reaction of an epoxy resin containing at least two epoxy groups per molecule and having an epoxy equivalent of 100–1000 with an unsaturated—monobasic acid in an amount such that there are 0.2–0.7 equivalents of carboxyl groups per 1 equivalent of epoxy groups in the presence of a catalyst selected from the group consisting of chromium napthenate, zirconium naphthenate, lithium naphthenate and lithium chloride;
   40–10 weight % of a radical polymerizable monomer; an organic peroxide; a curing agent for the epoxy resin; and one or more reinforcing material selected from continuous fibers and fiber cloth.

2. A curable composition for a fiber-reinforced resin as claimed in claim 1, wherein said epoxy resin is a glycidyl ether epoxy resin obtained by the condensation of at least one compound selected from bisphenol, phenolic novolak, cresol novolak, bisphenol halide, novolak halide, diaminodiphenylmethane, diaminodiphenyl sulfone, and aminophenol with an epihalohydrin, a triazine glycidyl ether epoxy resin obtained by the condensation of cyanuric acid or isocyanuric acid with an epihalohydrin, or a glycidyl ester epoxy resin obtained by the condensation of an aromatic polycarboxylic acid with an epihalohydrin.

3. A curable composition for a fiber-reinforced resin as claimed in claim 1, wherein said unsaturated-monobasic acid is acrylic acid or methacrylic acid.

4. A curable composition for a fiber-reinforced resin as claimed in claims 1, 2 or 3, wherein:
   0.1–5 parts by weight of an organic peroxide;
   0.5–70 parts by weight of a curing agent; and
   50–80 weight parts by weight of reinforcing materials per 100 parts by weight of the total of said epoxy-containing resin and said radical polymerizable monomer are present in the composition.

* * * * *